US005542637A

United States Patent [19]
Schriner

[11] Patent Number: 5,542,637
[45] Date of Patent: *Aug. 6, 1996

[54] MOUSE PAD WITH STORAGE COMPARTMENT

[75] Inventor: Michael J. Schriner, Santa Fe, Calif.

[73] Assignee: Hunt Holdings, Inc., Wilmington, Del.

[ * ] Notice: The term of this patent shall not extend beyond the expiration date of Pat. No. Des. 361,326.

[21] Appl. No.: 315,137

[22] Filed: Sep. 29, 1994

[51] Int. Cl.⁶ .................................................. A47B 91/00
[52] U.S. Cl. ................... 248/346.01; 248/118; 248/918; 206/576; D14/114
[58] Field of Search ..................................... 248/346, 118, 248/118.1, 118.3, 118.5, 918; D14/114; 206/334, 223, 576; 220/555, 552, 523; 446/75, 76

[56] References Cited

U.S. PATENT DOCUMENTS

| D. 339,799 | 9/1993 | Allen | D14/114 |
|---|---|---|---|
| D. 361,326 | 8/1995 | Schriner | D14/114 |
| 1,720,682 | 7/1929 | Larter . | |
| 4,799,054 | 1/1989 | House | 340/710 |
| 4,927,986 | 5/1990 | Daly | 178/18 |
| 5,163,547 | 11/1992 | Hseih | 206/1.7 |
| 5,203,669 | 4/1993 | Ghang et al. | 220/555 X |
| 5,340,075 | 8/1994 | Schriner | 248/118 |

Primary Examiner—Ramon O. Ramirez
Attorney, Agent, or Firm—Synnestvedt & Lechner

[57] ABSTRACT

A mouse pad for supporting a computer mouse, having an ergonomically comfortable sloping front top portion for supporting the hand and/or wrist of a user of the mouse, wherein the pad comprises an interior storage compartment covered by an upwardly-pivotable lid which, when closed, forms a smooth top surface with the adjacent pad.

8 Claims, 5 Drawing Sheets

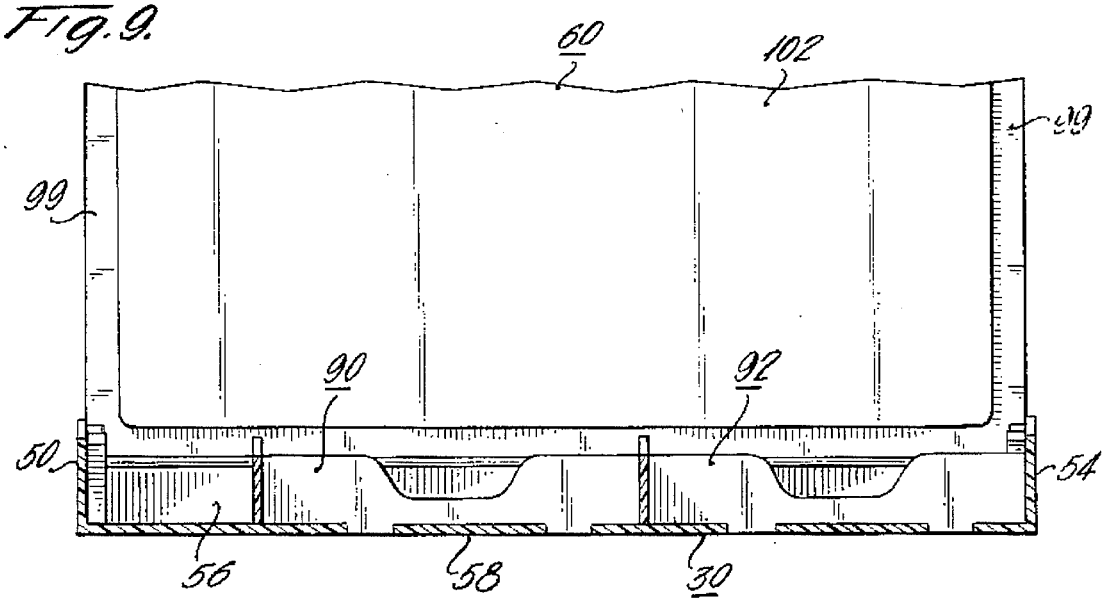
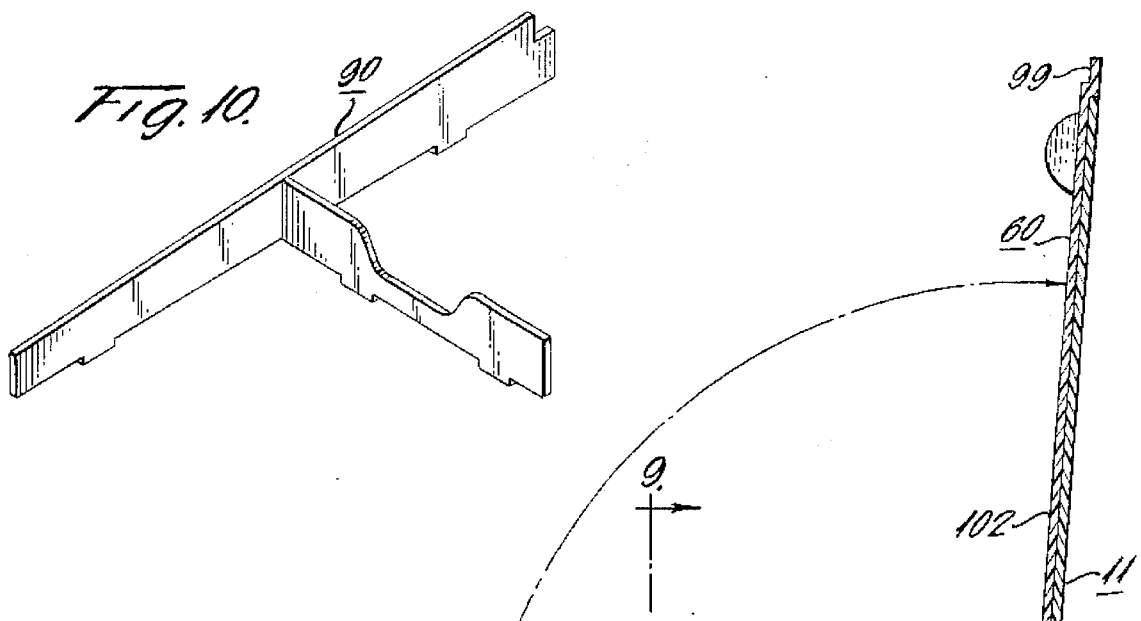
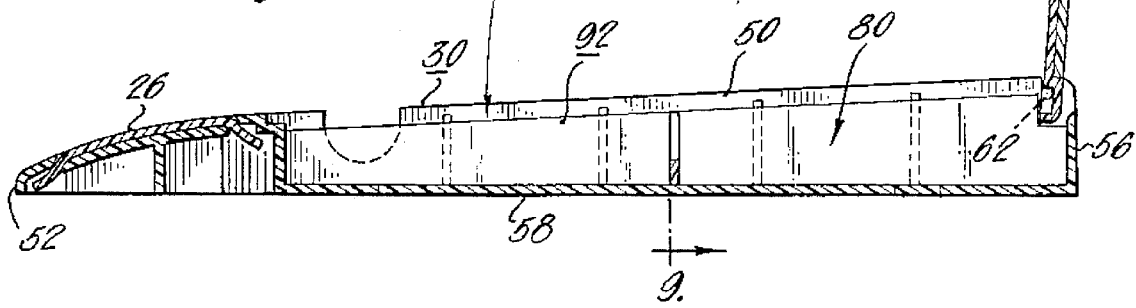

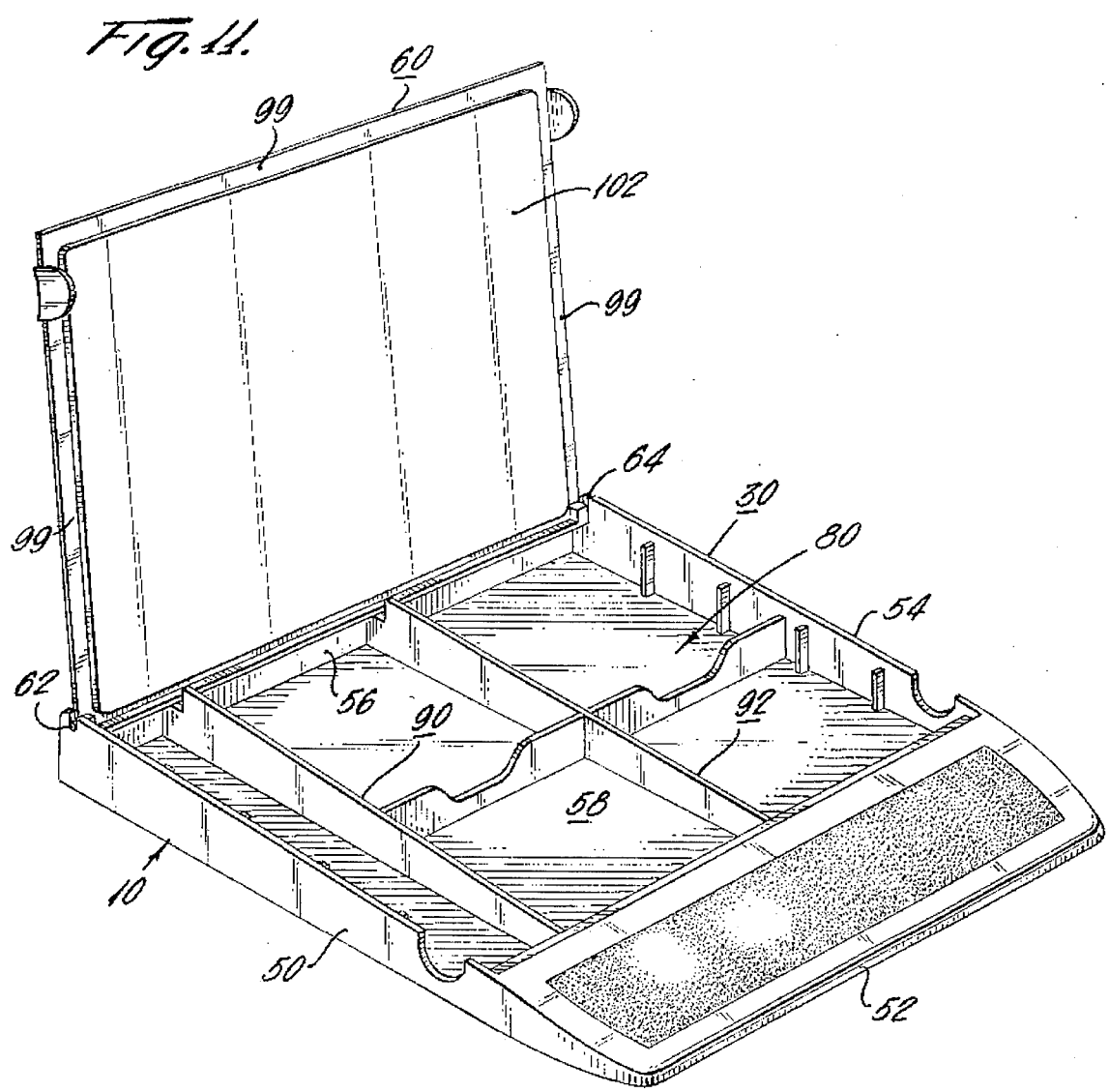

MOUSE PAD WITH STORAGE COMPARTMENT

FIELD OF THE INVENTION

This invention relates to mouse pads for supporting a computer mouse during its use.

BACKGROUND OF THE INVENTION

The computer mouse is now a well-known adjunct to certain types of computers, enabling control of a monitor cursor or the like by rolling a so-called mouse around on a supporting surface, the mouse generally also having control elements, operable by the fingers of the same hand which moves the mouse, to perform control functions in the computer. Mouse pads are also known on which a mouse can be placed to roll it about, thereby protecting the underlying support surface such as a desk top, and at the same time providing a suitable type of surface on which to roll the mouse.

U.S. Pat. Patent application Ser. No. 07/925,729 of Michael J. Schriner, filed Aug. 5, 1992, discloses an improved form of mouse pad incorporating a sloping top surface having a flat, horizontal surface portion and a sloping portion which preferably is convex from one edge of the pad upward, to merge smoothly with the flat, horizontal top surface of the pad; this provides an ergonomically-comfortable sloping surface on which the user can rest his hand and/or wrist, for comfort during extended use of the mouse.

Also typically employed in the described environment are various accessories such as pens, pencils, paper clips, pads, cards, stick-on paper tabs, etc., which typically tend to clutter the adjacent work surface or are placed more remotely from the mouse pad than is convenient.

It is an object of this invention to provide a mouse pad, and a system employing same, which is ergonomically comfortable to use in operating a computer mouse and yet makes it possible to minimize the usual clutter of nearby computer accessories.

SUMMARY OF THE INVENTION

In accordance with the invention, a mouse pad is provide with an integral storage compartment within it which is accessible through a top lid, this lid preferably being upwardly-pivotable and forming the portion of the pad top surface on which the mouse is rolled during use. The lid, when closed, is preferably recessed into the top of the mouse pad to provide a substantially smooth top surface for the pad, and is hinged at a position near the rear of the said top surface so as to permit easy front access to the compartment when the lid is opened. In its preferred form, the compartment is partitioned to permit convenient storage of different accessories, and the lid is preferably made of a smooth polyvinyl material to permit easy and quick movement of the mouse across it.

BRIEF DESCRIPTION OF THE DRAWINGS

These and other objects and features of the invention will be more readily understood from a consideration of the following detailed description, taken with the accompanying drawings, in which:

FIG. 8 is a sectional view taken along lines 8—8 of FIG. 3, but with the lid open;

FIG. 9 is a fragmentary sectional view taken along lines 9—9 of FIG. 8;

FIG. 10 is a isometric view showing one of the two optional plug-in divider assemblies; and FIG. 11 is a perspective view of the mouse pad, as seen from the top left front, with the lid open.

DETAILED DESCRIPTION OF PREFERRED EMBODIMENT

Figure 1:
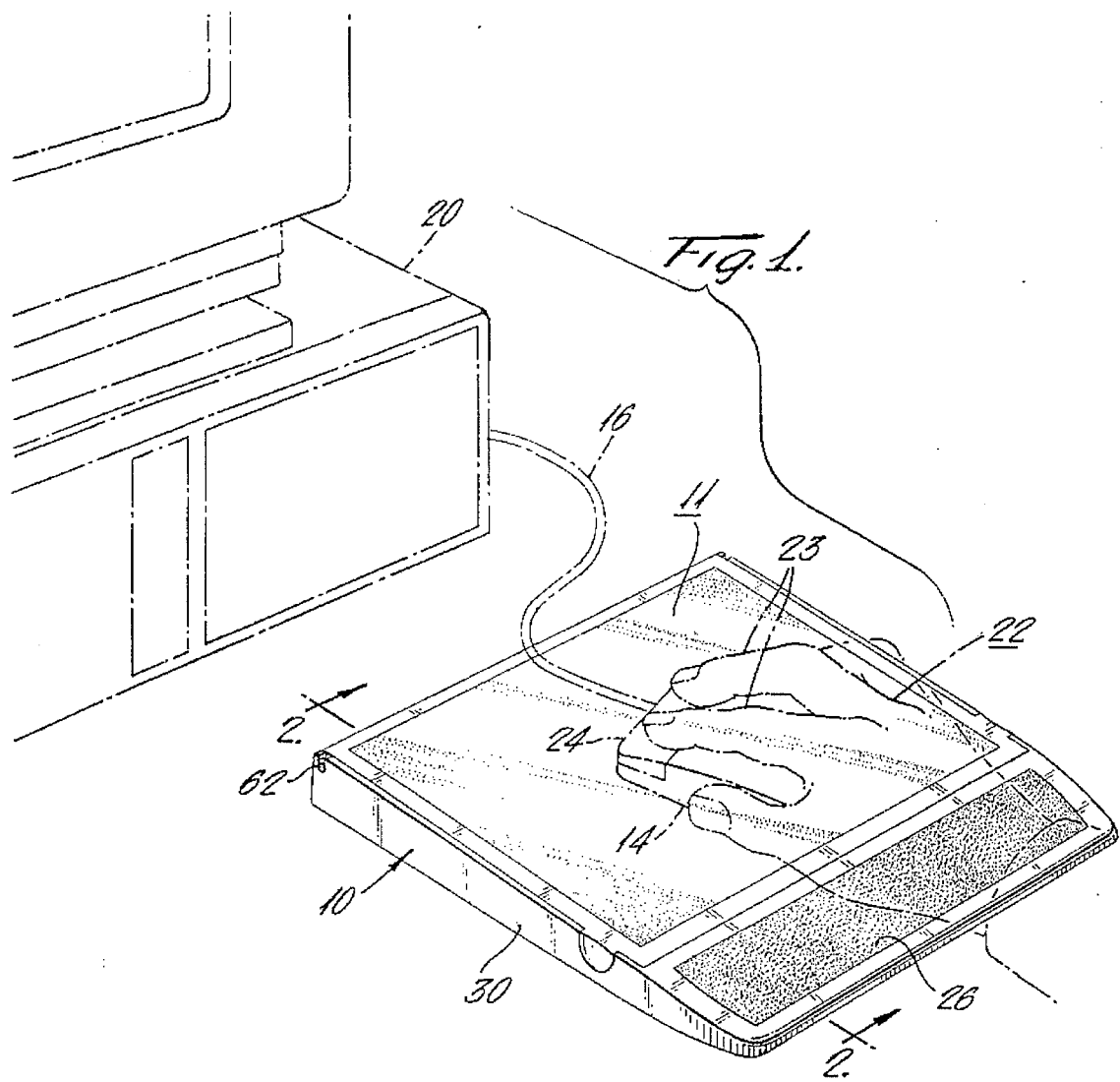
FIG. 1 is a perspective view of a combination of computer apparatus, mouse and mouse pad according to a preferred embodiment of the invention.

Turning now to the preferred embodiment of the invention shown by way of example only in the accompanying drawings, and without thereby in any way limiting the scope of the invention, FIG. 1 shows a system using the invention and comprising a mouse pad 10 supporting on its flat, horizontal top surface region 11 a mouse 14 which is connected over cable 16 to an adjacent computer system 20; also shown is the hand 22 of a user, the hand extending over the mouse to facilitate its smooth movement about on the top surface of the pad, the fingers 23 of the hand being extended to operate computer control elements such as 24 on the mouse; the wrist region of the user rests upon the inclined, convex, top surface portion 26 of the mouse pad for comfort. The user is thus enabled to move the mouse about on the flat top surface 11 of the mouse pad, thereby to exchange signals with the computer over cable 16 so as to control movement of the cursor on the computer monitor, while also providing for operation of the control elements 24 by the user's fingers while he rests his wrist-hand region wherever he chooses on the convex surface of the sloped, convex, mouse pad top portion 26.

Turning now to the mouse pad itself as shown in the other figures, it comprises an outer casing 30 having four sides 50, 52, 54, 56 and a bottom 58, preferably made of styrene. The upwardly pivotable lid 60 is preferably made of polyvinyl so as to present a hard, smooth upper surface. The lid is mounted to the casing 30 by hinge means 62 and 64 of conventional type, consisting essentially of a pair of pins 66 and 68 extending from opposite sides of the lid into corresponding sockets formed in the casing.

To facilitate opening of the lid 60, axially aligned cut-outs 74, 76 are located in the top edges of the side walls of the casing, so that the user can insert a finger into each such opening and urge the lid upwardly by pushing his fingers upwardly against the bottom surface of the lid. Preferably the lid and hinge arrangement are such that once opened beyond an over-center point, it stays fixed and need not be held open while one places accessories into, or removes them from, the storage compartment 80 contained within the pad, beneath the lid.

As shown, this storage compartment 80 occupies substantially all of the interior of the pad, and is preferably partitioned by removable plug-in tray dividers such as 90, 92, so that items such as pencils, pens, pads, and paper clips, as examples, may be placed into the compartment and segregated from each other for convenience.

Figure 2:
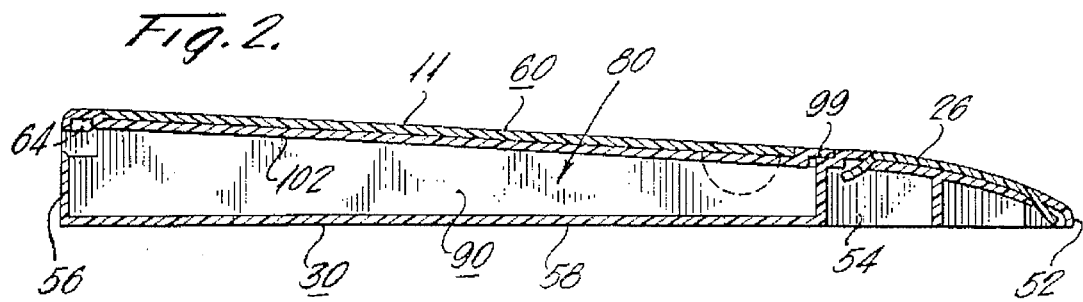
FIG. 2 is a sectional view taken along lines 2—2 of FIG. 1.
Figure 4:
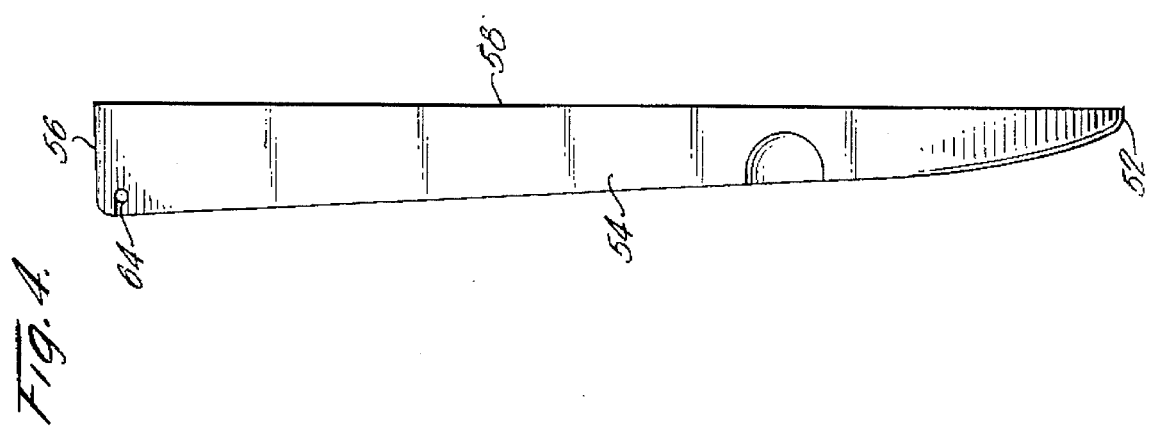
FIG. 4 is an end view of the pad of FIG. 3.
Figure 3:
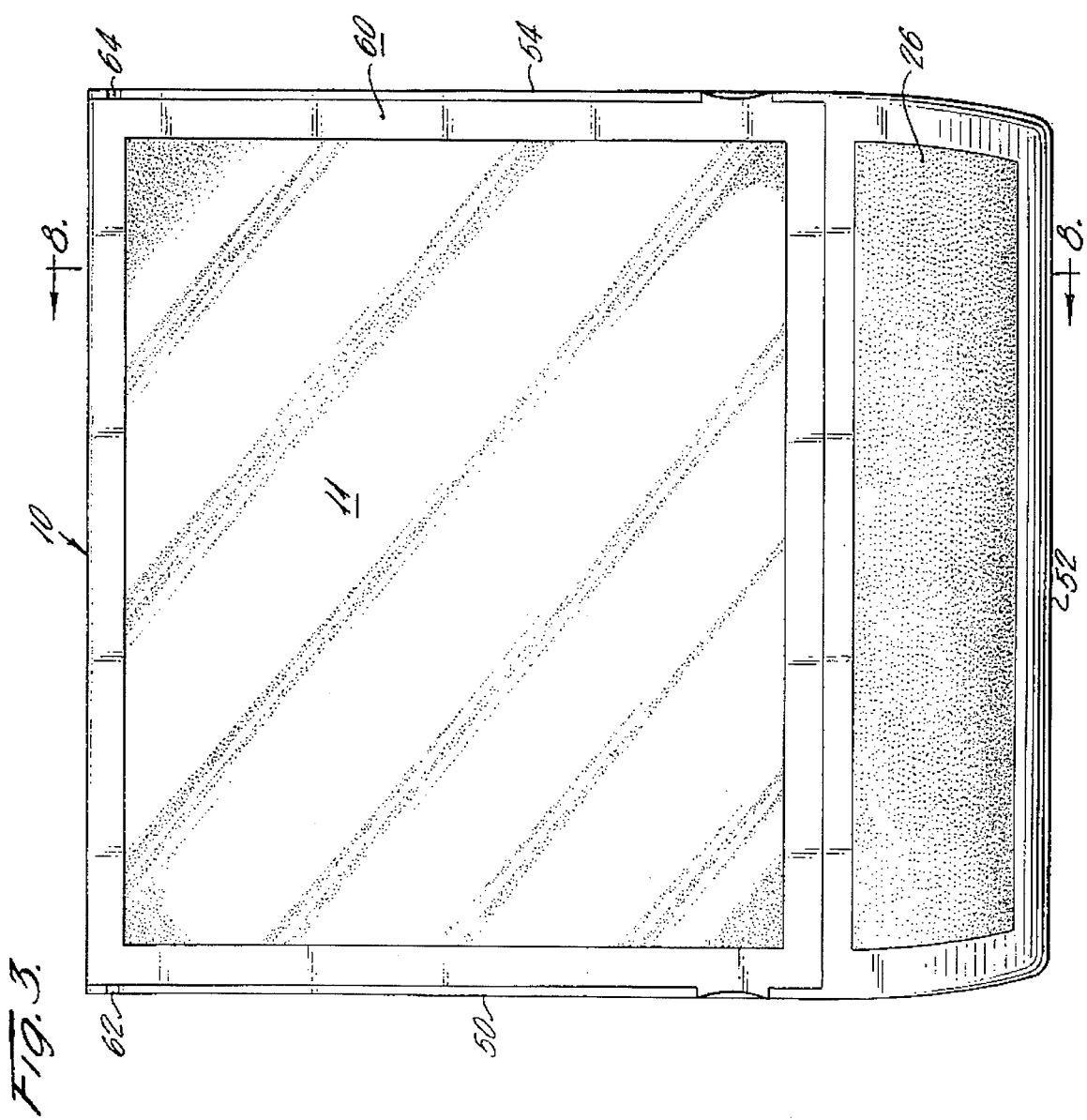
FIG. 3 is a top view of the preferred embodiment of the mouse pad of the invention, with the lid closed.
Figure 5:
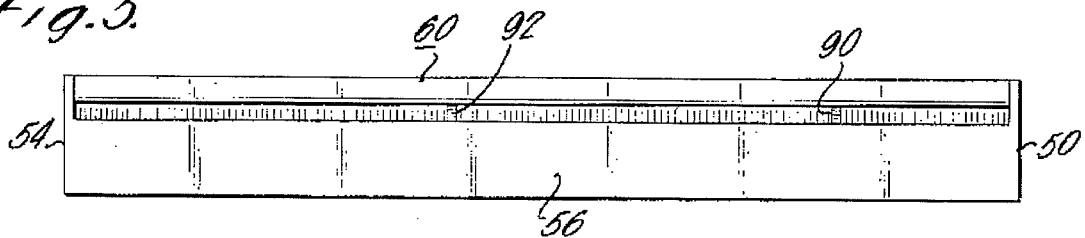
FIG. 5 and 6 are, respectively, front and rear views of the same pad.
Figure 6:
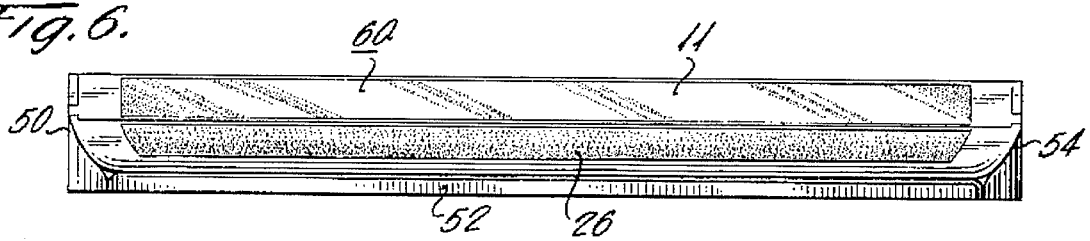
Figure 7:
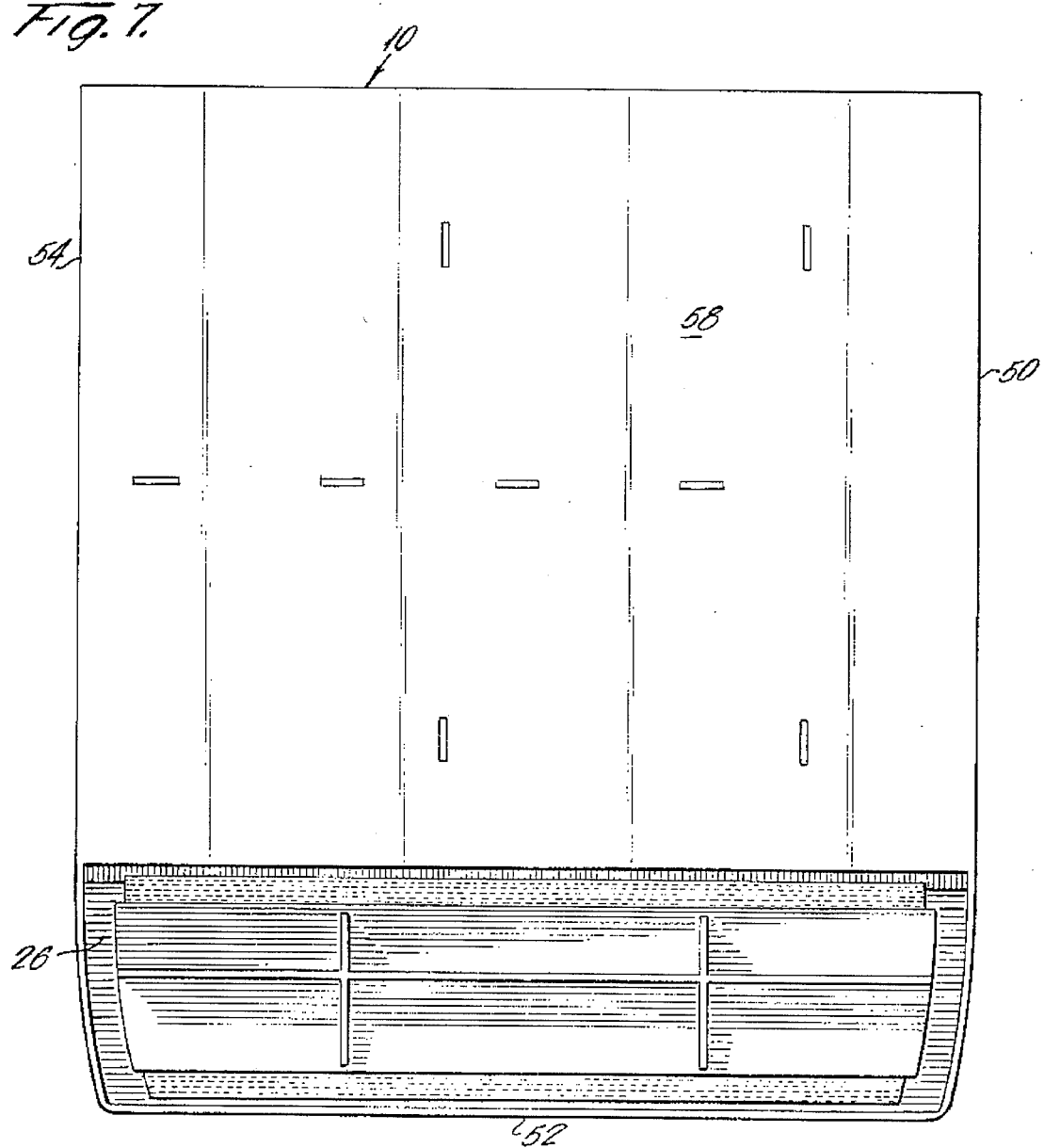
FIG. 7 is a bottom view of the pad.

FIG. 2 shows in cross-section how the lid is recessed into the top of the casing. The top opening of the storage compartment is provided with a ledge 99 around its periphery, on which an outer peripheral flange 100 of the lid rests; the remaining portion 102 of the lid is preferably thicker to provide strength and rigidity, and extends downwardly a short distance between the inner edges of the ledge as shown.

In use then, with the mouse removed from the top of the pad, the lid 60 may be opened at any time to place accessories or other materials into the storage compartment 80 or to remove them, whichever is desired. With the lid closed, the mouse is placed upon the top of the lid and moved about by the user's hand to effect the desired cursor movement, while other computer control is effected by the user's fingers operating the control elements such as 24 of the mouse. Meanwhile, the user may adjust the position of his hand and of the mouse to achieve the most comfortable position available to him on the pad.

In this way there is provided a mouse pad which is easy and comfortable to use, and yet which provides for the storage and easy retrieval of accessories desired for use in the vicinity of the pad.

While the invention has been described with particular reference to specific embodiment, in the interest of complete definiteness, it will be understood that it may be embodied in a variety of forms diverse from those specifically shown and described, without departing from the spirit and scope of the invention as defined by the appended claims.

What is claimed is:

1. A hand-rest pad for supporting a computer mouse, said pad having a substantially flat, horizontal top surface portion for supporting the mouse and a sloped portion extending upwardly from the front of said pad to merge with said flat top surface portion, said pad being hollow to define an article storage compartment therein, and said top portion comprising an upwardly-pivotable lid for said storage compartment, providing access to said compartment.

2. The pad of claim 1, wherein the outer surface of said sloped portion is convex upward.

3. The pad of claim 1, wherein said lid is hinged to pivot about an axis near its rear edge.

4. The pad of claim 1, wherein said lid, when closed, is recessed into said pad to present a smooth continuous surface with the adjacent top surface of said pad.

5. The pad of claim 1, comprising partitions dividing said compartment into a plurality of sections.

6. An assembly of a computer, a computer mouse, means connecting said mouse to said computer, and a mouse-support pad for said mouse, wherein:

said pad comprises a top surface portion on which said mouse is supported, said mouse support pad having a storage compartment therein, and said top surface portion comprising an upwardly-pivotable lid positioned above said compartment for providing access to said compartment.

7. The assembly of claim 6, wherein said lid is pivotable about an axis near the rear of said pad.

8. The assembly of claim 6, wherein said pad comprises adjacent portions extending forwardly of said lid, and wherein the top of said lid, when said lid is closed, forms a smooth substantially continuous surface with adjacent portions of said pad.

* * * * *